July 28, 1959 D. F. BROWER 2,897,462

VARIABLE RELUCTANCE ELECTROMAGNETIC DEVICE

Filed June 1, 1956 2 Sheets-Sheet 1

DAVID F. BROWER,
INVENTOR

BY [signature]

ATTORNEY

July 28, 1959 D. F. BROWER 2,897,462

VARIABLE RELUCTANCE ELECTROMAGNETIC DEVICE

Filed June 1, 1956 2 Sheets-Sheet 2

DAVID F. BROWER, INVENTOR

BY [signature]

ATTORNEY

United States Patent Office 2,897,462

Patented July 28, 1959

2,897,462

VARIABLE RELUCTANCE ELECTROMAGNETIC DEVICE

David F. Brower, Torrance, Calif., assignor to Hughes Aircraft Company, Culver City, Calif., a corporation of Delaware Application June 1, 1956, Serial No. 588,711

7 Claims. (Cl. 336—30)

This invention relates generally to variable reluctance electromagnetic devices and more particularly to devices of this general type adaptable for detecting incremental physical displacements.

In certain of its aspects, this invention relates to a copending application of the applicant, Serial No. 533,602, filed September 12, 1955, entitled "Twin Gap Recording Head" and assigned to the assignee of this invention.

For the purpose of discussion only and without any intention of limiting the present invention as to application, this invention is considered in connection with the automatic positioning of parts or work pieces upon which assembly or tooling operations are to be performed. Such systems are known in the art and need not be elaborated upon in detail, but it may be said, in general, that a fundamental requirement in such arrangements is accuracy of positioning of the work piece at the various machine stations at which work piece operations are to be automatically performed.

Positioning accuracy in any servo is dependent upon an accurate position detector, which latter obviously must be at least as accurate as the smallest dimensional error tolerance in the particular work piece operation. As the dimensional tolerance is decreased in size, the selection of conventional expedients for position detection is narrowed and, in the range of one mil or less, proportional types of electrical detectors are usually unsatisfactory. These considerations coupled with considerations relating to the compatability of such devices to control systems requiring discrete bits of information, indicate the need for a position detector capable of detecting discrete steps of displacement. The advantages of this conclusion will be apparent hereinafter.

One object of this invention is to provide a variable impedance device sensitive to small physical displacements.

Another object of this invention is to provide an electromagnetic device capable of producing repetitive changes in electrical characteristics in dependence of predetermined incremental displacements.

It is also an object hereof to provide an electromagnetic device capable of detecting incremental displacements wherein accurate position sensing is dependent primarily upon accurately machinable dimensions substantially to the exclusion of dependency upon proportionality between mechanical and electrical characteristics.

For a better understanding of the invention together with other and further objects thereof, reference is made to the following description taken in conjunction with the accompanying drawings given by way of example wherein.

As earlier noted herein, one of the importance problems in machine tool automation is the provision of a suitable detector of small physical displacements. Proportional types of physical displacement detectors suitable for application in detecting physical displacements of the order of one mil or less are usually very sensitive and physically delicate. It is very difficult to avoid calibration drift in such devices in the presence of temperature excursions and other environmental variables. Also, since such devices are usually highly sensitive to shock, vibration isolation may become a major problem. Additionally in the range about zero displacement the signal level available from a proportional device is usually very low and accurate positioning in this range is extremely difficult. Thus a device of the type herein proposed offers numerous advantages, both from the standpoint of structural ruggedness and from the standpoint of a strong electrical signal in and about the point of zero error. Moreover, since the change in electrical characteristics of this device with discrete steps of displacement is between predetermined extremes, that is, predetermined high and low values, and since suitable circuitry may be designed which is relatively insensitive to minor excursions in these extremes, it will be appreciated that the problem of parameter drift is minimized.

Figure 1:
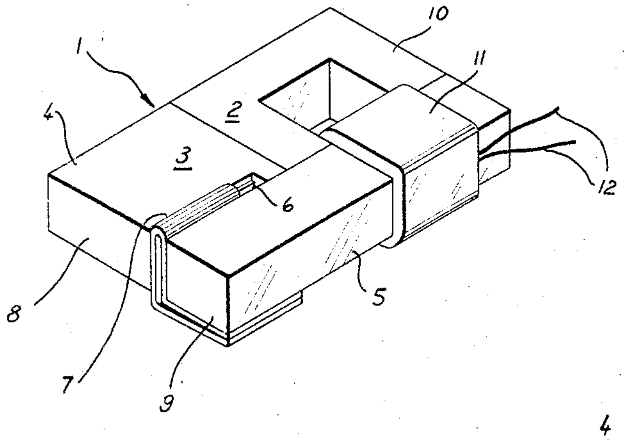
Fig. 1 is an isometric view of an electromagnetic detector head.

The complete detector head is illustrated in Fig. 1. A head embodying the principles of operation of the head shown in Fig. 1 is described in some detail in the aforesaid copending application of D. F. Brower and will be described herein only to the extent necessary to afford an understanding of the present invention.

The head assembly which is generally designated 1 comprises two substantially independent magnetic circuits respectively designated 2 and 3. The magnetic circuit 3 is a three legged core assembly comprising two large core sections 4 and 5, of ferrite or other suitable magnetic material, constituting the two outer legs of the three legged assembly, and a relatively thin center leg 6 which may be, for example, of some highly permeable magnetic material such as "permalloy," formable in thin foil thickness of the order of a few ten-thousandths of an inch. A single turn detector coil 7 of thin silver foil or other suitable electrical conducting material is disposed about the center leg. The bottom faces of the core sections or legs 4 and 5 together with the bottom face of the center core leg 6, define pole faces occupying positions in a single plane, which may be accomplished by suitable surface grinding so that the pole faces are substantially perfectly flat. Of course it will be appreciated that depending upon the character of the surface against which the pole faces 8 and 9 are to operate, these surfaces may be ground to any suitable configuration. As more clearly shown in Fig. 3 the single turn detector coil or winding is set back from the pole faces, to prevent its lower edges from contacting the scale which may short circuit part or all of the coil. As a practical matter this may be accomplished by a suitable preferential etching process.

Magnetic circuit 2 comprises a U-shaped magnet 10 which is bridge by an extension of the ferrite leg 5. A winding 11 is wound about the extension of the core leg 5 in a position thereon between the legs of the U-shaped core section 10. Part of the loop (not shown) of the single turn detector coil extends up the back of leg 5 as viewed in Fig. 1 to a position beneath winding 11 and is inductively coupled with winding 11. Leads 12 are brought out of the transformer from the other winding to complete the circuit. In this application the single turn coil functions as the primary winding. The transformer is combined in the detector head assembly to provide a transformed inductance of usable magnitude, since the single turn detector coil 7 has an extremely low inductance. By building the transformer into the head, lead inductance and resistance which would mask the relatively large percentage change in the inductance of the detector coil are avoided. As a typical example, the effective inductance of the assembly including the transformer is about 100 micro-henrys.

Figure 2:
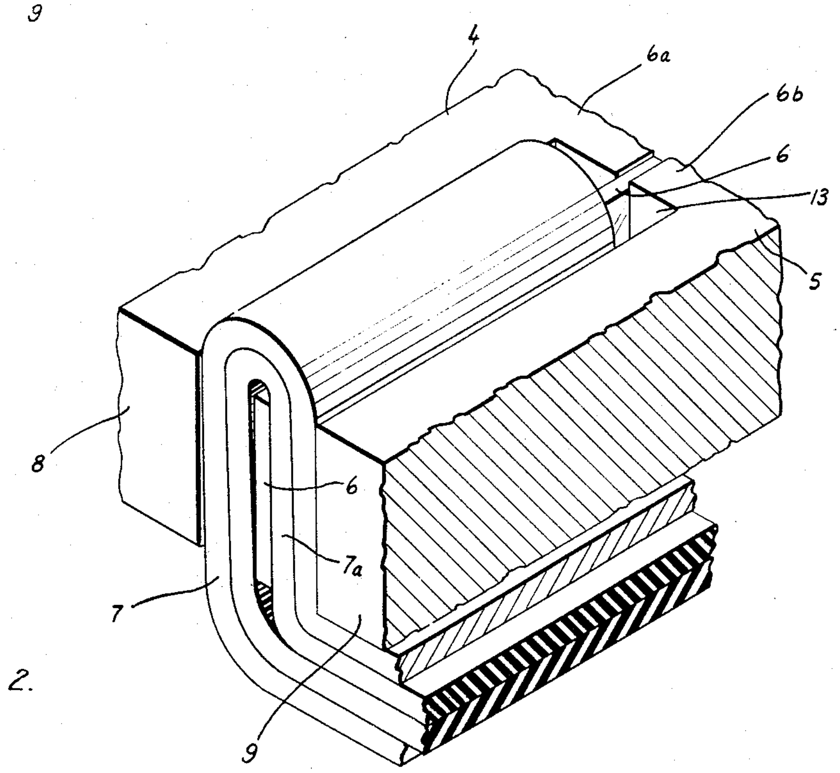
Fig. 2 is an enlarged fragmentary isometric view of the electromagnetic detector head showing the pole faces and the detector coil assembly.

The details of the detector coil and core assembly will be readily apparent from an inspection of the enlarged fragmentary illustration of Fig. 2. In this illustration, a layer of electrical insulating paper is shown disposed between the turns of the single turn winding 7 and the thin center leg 6 of the core. The cavity 13 in which the detector coil assembly is mounted is determined by respective shoulders *6a* and *6b* on the ferrite core legs 4 and 5. Insulation between the coil and the ferrite core may be provided but is not needed. Other core materials may require insulation to prevent coil shorting. These shoulders contact the center leg 6 at a point above the detector coil assembly, tending to minimize magnetic circuit losses in and about this region of contact.

While not illustrated in Fig. 1 the assembly shown in Fig. 1 may be enclosed or potted in a suitable housing of brass, for example, which in addition to mechanically integrating the arrangement also functions as a shield tending to minimize stray pickup.

Figure 3:
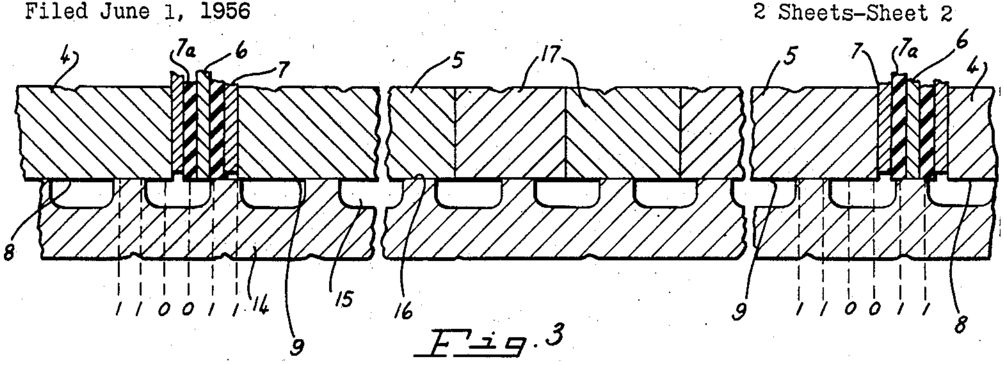
Fig. 3 is an enlarged sectional view showing a back-to-back arrangement of a pair of the electromagnetic detector heads positioned with respect to an engraved scale, the basic geometry being such as to afford directivity with respect to relative motion between the scale and the repective heads.

The complete assembly is fragmentarily illustrated in Fig. 3. Here discrete steps of physical displacement are established by means of an engraved scale 14 comprised of regularly spaced laterally disposed grooves 15 defining lands 16 therebetween. In one practical embodiment of this invention, the flat pole faces of the respective legs 4, 5 and 6 are disposed to slide along the flat surface lands of the engraved scale 14. From Fig. 3, which in enlarged scale approximately indicates the relative dimensions of the grooves and lands, for one mode of operation, with respect to the respective pole faces, it will be seen that the pole face defined at the bottom end of the center leg 6 has a width substantially less than the width of the respective grooves 15 and that the pole faces 8 and 9 defined by the respective outer ferrite core legs 4 and 5 have sufficient width to straddle a plurality of the grooves and lands, so that the primary change in magnetic reluctance of the detector magnetic circuit is due to the position of the center core leg 6 with respect to the grooves and the lands of the engraved scale 14 and relatively insensitive to variations in position of the pole faces 8 and 9 along the engraved scale. Thus a positive indication of the position of the electromagnetic detector with respect to a groove or a land is obtained.

Figure 5:
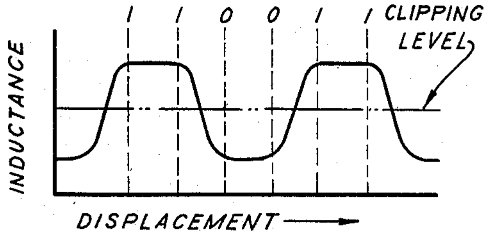
Fig. 5 is a curve graphically illustrating characteristic inductance changes in any single electromagnetic detector head as a function of displacement. This may also be construed to indicate the change in voltage as a function of displacement.

Referring further to Fig. 3 and particularly to the detector head assembly on the left which is positioned over a groove 15, it will be seen that as the center core leg 6 approaches a groove edge at which point it passes over a land, the dimension of the air gap between the pole face of the center core leg and the slot edge diminishes. In view of this, the magnetic reluctance, due to the diminishing air gap, changes rapidly which in effect results in a degree of anticipation of approach of the land. To obtain an inductance change referred to displacement which is approximately equal in width in its two extremes, it has been found desirable to make the width of the center core leg pole face approximately equal to or less than one-half of the width of the groove. Thus, by reference to Fig. 5 which shows a plot of the inductance change against displacement, it is possible to provide signals resulting from the inductance change which in the two extremes are approximately equal in width with displacement.

It will be appreciated that the apparatus described to this point is capable of detecting discrete steps of displacement determined by the spacing between the centers of the grooves of the engraved scale. Accurate position detection is determined primarily by the magnitude of the spacing between these grooves and by the accuracy of the spacing. Present machine tool accuracies or the accuracy provided by well-known etching processes are usually more than adequate in providing the accuracy needed for the machine tool automation application. Thus, while changes in electrical characteristics are a basic necessity in producing electrical signals indicative of discrete displacement steps, it will be appreciated that the equipment is primarily not dependent upon exact values of these electrical variations but dependent substantially only upon the accuracy of the scale, which is a mechanical problem and which may be predetermined in the manufacturing process.

Directional sensing may be obtained by utilizing two heads arranged in back-to-back relation and spaced so that when the center leg of one detector head is over a land such as shown on the right in Fig. 3, the center leg of the other detector head is one-quarter of the distance between successive lands 16 over a groove 15. Parts on the detector head on the right in Fig. 3 corresponding to those on the head on the left bear like reference characters. Physically, this arrangement involves employing two complete assemblies such as illustrated in Fig. 1 and positioning these two assemblies in abutting relation. This is illustrated fragmentarily in enlarged scale in Fig. 3, which also shows fragmentary portions 17 of the non-magnetic housings referred to above. For the purpose of this description the grooved scale 14 has been divided into one quarter increments in the regions adjacent the detector heads and marked with 1's and 0's in positions corresponding respectively to high and low coil inductance values according to one convention of Boolean algebra logic. Assuming motion of the detector head assembly is toward the left as seen in Fig. 3, it will be appreciated that as the center core leg 6 of the assembly on the left moves across groove 15 towards the land on the left thereof that the reluctance of the magnetic circuit associated with this detector head will remain high through the two 0 positions indicated. On the other hand, referring to the detector head assembly on the right, as the core leg 6 thereof moves across the land over which it is illustrated and over the groove adjacent thereto, the reluctance of the magnetic circuit associated therewith will remain low through position 1 and then increase with movement through the adjacent 0 position. For the binary code convention which has been herein adopted, on moving from left to right, the left head passes successive points 1 1 0 0 1 1 0 0 etc. while the right head passes successive points 1 0 0 1 1 0 0 1. Thus from any point along the scale, motion to the left or to the right results in electrical signals which in terms of a binary code give directional information.

Figure 6:
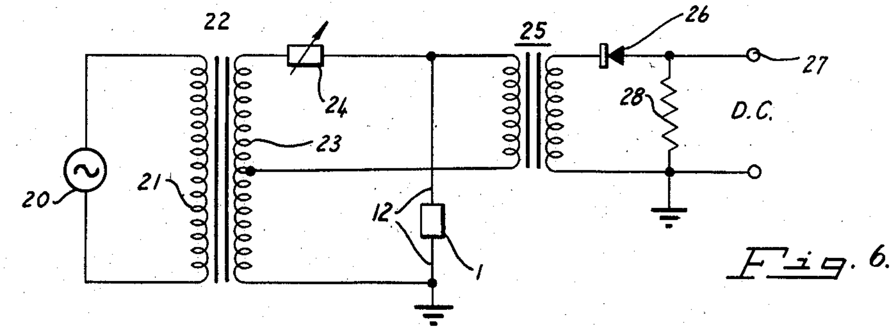
Fig. 6 diagrammatically illustrates a conventional normally balanced electrical circuit involving an electromagnetic detector.

The circuit arrangement in Fig. 6 illustrates a typical alternating current energized electrical bridge circuit supplied by a suitable alternating current source 20 connected to the primary winding 21 of a transformer generally designated 22, having a center tapped secondary winding 23. The tapped sections of secondary winding 23 constitute adjacent legs of an electrical bridge circuit, the remaining adjacent legs of which comprise a balancing impedance 24 and a detector head assembly 1, of the type herein described. The output of this alternating current bridge circuit is applied to the primary winding of a transformer generally designated 25, the secondary winding of which is connected across a suitable load resistor or impedance device 28 having a rectifier 26 connected in series therewith. The direct current output of this bridge circuit appears between terminals 27. Obviously, this bridge circuit may be normally balanced for either magnitude of impedance of the detector head assembly 1. By this means, the output of the bridge circuit may be varied between zero, or some predetermined low value of direct current output voltage, and some predetermined higher magnitude of direct current output voltage. The use of two such bridge circuits and the comparison of the direct current voltage outputs thereof, when referred to a physical arrangement such as illustrated in Fig. 3, or the comparison of the bridge outputs, after conventional clipping and squaring, in binary circuits, results in an arrangement whereby the direction of motion may be detected. This latter expedient results in four binary counts per scale division as evidenced in Fig. 3. Accurate position sensing with respect to a point of zero reference or an indexing position may also be accomplished. However, with a head assembly as shown in Fig. 3, this requires additional equipment involving memory circuits and counting circuits which are beyond the scope of this application. Such expedients, however, are known to those skilled in the art. Alternatively as is sometimes done with photoelectric detecting arrangements a plurality of coded grooved scales may be provided in conjunction with respective detector heads such that binary coded signals are produced by the respective heads to indicate specific incremental displacements directly, or, a single scale with laterally disposed, staggered heads, or, longitudinally disposed heads as in Fig. 3, may be employed for the same purpose.

Figure 4:
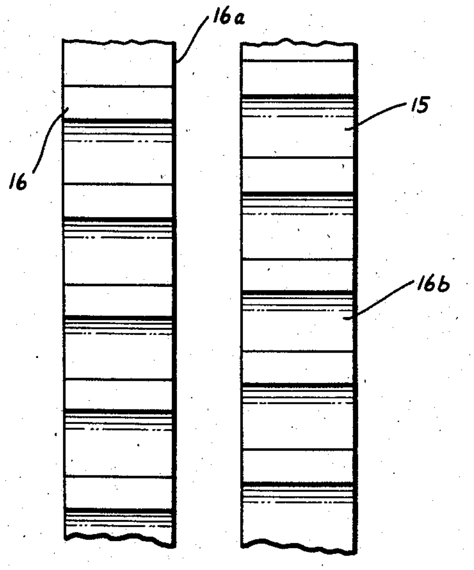
Fig. 4 illustrates a second arrangement, in a schematic way, for obtaining directivity with respect to relative motion between the respective scales and the pickup heads.

The staggered scale technique is shown in Fig. 4. In this arrangement, two engraved scales 16*a* and 16*b* are arranged in side-by-side relationship and indexed so that a land 16 of 1 is displaced one-quarter of the distance between the lands of the other. Thus, by indexing the respective detector heads so that the center core legs 6 of the respective heads are properly aligned, one occupying a position over a land while the other occupies a position over a groove, it is possible to obtain electrical variations in the respective detector heads, which when referred to a suitable reference alternating current voltage or when applied in bridge circuit arrangements, for example, as described in connection with Fig. 6, produce an indication of the direction of motion of the head assembly with respect to the scales. As a further alternative (not shown), the engraved scales may be indexed with the lands in alignment, or a single scale may be used, and the heads staggered in such positions that the same type of operation as described in connection with Fig. 4 is obtained.

In general, this apparatus is adaptable for measuring or detecting discrete steps of physical displacement and as such is also applicable in the field of strain measurement by the simple expedient of arranging one of the relatively movable detector parts for displacement with respect to the other in dependence of strain. With proper calibration in dependence of displacement due to strain, incremental values of stress in the associated stressed part may be determined. For a single value of stress, of course, a strip having a single discontinuity will suffice.

It will be appreciated from the foregoing considerations that the incremental position or displacement detecting device of this invention offers a number of advantages as outlined in the statements of objects and in the specification as set forth herein above. Further, the engraved scale is rugged and is relatively accurately made. The detector heads may be made to have small masses and, hence, may be held against the scale with a low pressure in the presence of a lubricant to minimize wear and still withstand accelerations of the order of 50 "G's," due to machine and floor vibrations and other sources, without affecting performance. The heads are rugged, easily constructed and can be designed for relatively high output. So far as electrical characteristics are concerned, and depending upon energizing frequencies, the heads should be capable of reading over $10^5$ scale graduations per second, which would correspond to two-hundred inches per second if the scale divisions were two-thousandths of an inch apart, so that any reasonable velocity is acceptable.

Although several embodiments of this invention have been herein illustrated and described, it will be appreciated by those skilled in the art that this invention both as to its details and as to the organization of such details, especially as to orientation of groups of detector heads and scales, may be modified without departing from the spirit and scope of the inventive subject matter. Accordingly, it is intended that the foregoing disclosure and the showings made in the drawings shall be considered only as illustrative of the principles of this invention and are not to be construed in a limiting sense.

What is claimed is:

1. An incremental displacement detector comprising; a scale of magnetic material having a scale path thereon defined by a sequence of spaced grooves and lands forming a plurality of similar scale divisions along one surface thereof, a core member having at least two legs in substantially side-by-side relation and having a coil thereon, the ends of said legs terminating in adjacent pole faces disposed in confronting relation with said surface of said scale, said core member and said scale being relatively movable to afford effective movement of said core member along said scale path, one pole face having a width less than one scale division and the other pole face having a width corresponding to and spanning the dimension across a predetermined plurality of scale divisions, providing magnetic resolution of said scale divisions only at said one pole face.

2. An incremental displacement detector comprising: an electromagnetic head having a three-legged core and a coil mounted on the center leg of said core, the ends of said legs defining pole faces; a scale of magnetic material having a scale path on one face thereof defined by a sequence of spaced, laterally disposed grooves alternated with lands and positioned with the scale path on said one face in close proximity to the pole faces of said electromagnetic head; said coil being adapted for electrical excitation, producing magnetic flux in said core linking said scale; the width of the pole face of said center leg being less than the width of said respective grooves and the width of the respective remaining pole faces straddling several grooves and lands of said scale whether said pole face of said center leg confronts a groove or a land, providing magnetic resolution of said scale only at said pole face of said center leg.

3. An incremental displacement detector comprising: an electromagnetic head having a three-legged core and a coil mounted on the center leg of the core, the ends of said legs defining pole faces; a slale of magnetic material having a scale path on one face thereof defined by a sequence of spaced, laterally disposed grooves alternated with lands; said scale having the scale path on said one face disposed with respect to said pole faces to form part of a magnetic flux path for said coil including said three-legged core; said coil being adapted for electrical excitation, producing magnetic flux in said core and said scale; the width of the pole face of said center leg being less than the width of said respective grooves and the width of the respective remaining pole faces straddling several of said grooves and lands of said scale whether said pole face of said center leg confronts a groove or a land, providing magnetic resolution of said scale only at said pole face of said center leg.

4. An incremental displacement detector comprising: an electromagnetic head having a three-legged core and a coil mounted on the center leg of said core, the ends of said legs defining pole faces; a scale of magnetic material having a scale path on one face thereof defined by a sequence of spaced, laterally disposed lands and grooves; said scale having the scale path on said one face slidably engaging said pole faces; said coil being adapted for electrical excitation, producing magnetic flux in said core and said scale; the width of the pole face of said center leg being less than the width of said respective grooves and the width of the respective remaining pole faces straddling several of said grooves and lands of said scale whether said pole face of said center leg confronts a groove or a land, providing magnetic resolution of said scale only at said pole face of said center leg.

5. An incremental displacement detector comprising: an electromagnetic head having a three-legged core and a coil mounted on the center leg of said core, the ends of said legs defining pole faces; a scale of magnetic material having a scale path on one face thereof defined by a sequence of spaced, laterally disposed lands and grooves; said scale having the scale path on said one face disposed with respect to said pole faces to form part of a magnetic flux path for said coil, including said three-legged core member; said coil being adapted for electrical excitation, producing magnetic flux in said core and said scale; the width of the pole face of said center leg being substantially one-half the width of the respective grooves and the width of the respective remaining pole faces straddling a plurality of said grooves and lands of said scale whether said pole face of said center leg confronts a groove or a land, providing magnetic resolution of said scale only at said pole face of said center leg.

6. An incremental displacement detector comprising: an electromagnetic head having a three-legged core and a coil mounted on the center leg of said core, the ends of said legs defining pole faces; a scale of magnetic material having a scale path on one face thereof defined by spaced, laterally disposed lands and grooves in which the width of the respective grooves is substantially twice the width of the lands therebetween; said scale being disposed with said scale path confronting said pole faces to form a magnetic circuit with said core for conducting magnetic flux produced by said coil; said coil being adapted for excitation with electrical energy; the width of the pole face of said center leg being substantially one-half the width of said respective grooves and the width of the respective remaining pole faces straddling a plurality of said grooves and lands of said scale whether said pole face of said center leg is over a groove or a land, providing magnetic resolution of said scale only at said pole face at said center leg.

7. An incremental displacement detector comprising: a core having at least two legs, the ends of said legs defining pole faces and one of said legs being of substantially thinner magnetic material than the other; a coil disposed about said one leg; a scale of magnetic material having a scale path on one face thereof defined by a sequence of spaced, laterally disposed lands and grooves; said scale having said scale path on said one face thereof disposed with respect to said pole faces to form part of a magnetic flux path for said coil including said core; said coil being adapted for excitation with electrical energy, producing magnetic flux in said core and said scale; the width of the pole face of said one leg being less than the width of said respective grooves and the width of the pole face at the end of said other leg straddling several grooves and the lands of said scale whether said pole face at said one leg is over a groove or a land, providing magnetic resolution of said scale only at said pole face at said one leg.

References Cited in the file of this patent

UNITED STATES PATENTS

| | | |
|---|---|---|
| 2,612,635 | West | Sept. 30, 1952 |

FOREIGN PATENTS

| | | |
|---|---|---|
| 352,795 | Great Britain | July 16, 1931 |
| 841,103 | France | Feb. 1, 1939 |